(12) United States Patent
Schwab et al.

(10) Patent No.: US 7,585,453 B2
(45) Date of Patent: Sep. 8, 2009

(54) DEVICE AND METHOD FOR THERMOFORMING AN OBJECT HAVING A BACK DRAFT PORTION

(75) Inventors: Dominique Schwab, Versailles (FR); Timothy Cooper, L'Haye les Roses (FR)

(73) Assignee: ERCA Formseal, Les Ulis (FR)

( * ) Notice: Subject to any disclaimer, the term of this patent is extended or adjusted under 35 U.S.C. 154(b) by 414 days.

(21) Appl. No.: 10/522,213

(22) PCT Filed: Jul. 17, 2003

(86) PCT No.: PCT/FR03/02257

§ 371 (c)(1),
(2), (4) Date: Dec. 13, 2005

(87) PCT Pub. No.: WO2004/009333

PCT Pub. Date: Jan. 29, 2004

(65) Prior Publication Data

US 2006/0113715 A1    Jun. 1, 2006

(30) Foreign Application Priority Data

Jul. 19, 2002   (FR) .................................. 02 09186

(51) Int. Cl.
*B29C 49/12*   (2006.01)
(52) U.S. Cl. .................. 264/523; 264/531; 264/318; 264/320; 425/525; 425/528; 425/537; 425/348 S; 425/422
(58) Field of Classification Search ......... 425/525–529, 425/534, 537, 348 S, 422, 398; 264/531–532, 264/523, 318, 320
See application file for complete search history.

(56) References Cited

U.S. PATENT DOCUMENTS

| 3,375,553 | A | * | 4/1968 | Criss .......................... 425/587 |
| 4,137,031 | A | * | 1/1979 | Dickson et al. ............. 425/528 |
| 4,155,974 | A | * | 5/1979 | Valyi .......................... 264/513 |
| 4,265,852 | A | * | 5/1981 | Sauer ....................... 425/387.1 |
| 4,327,052 | A | * | 4/1982 | Sauer .......................... 264/512 |
| 4,330,255 | A |   | 5/1982 | Suzuki |
| 4,375,947 | A | * | 3/1983 | Marcus ....................... 425/525 |
| 5,762,970 | A | * | 6/1998 | Takashima et al. .......... 425/525 |
| 6,176,699 | B1 | * | 1/2001 | Franjo et al. ................ 425/528 |
| 7,335,011 | B2 | * | 2/2008 | Zoppas ....................... 425/528 |
| 2003/0122287 | A1 | * | 7/2003 | Marcel et al. ............... 264/536 |

FOREIGN PATENT DOCUMENTS

| EP | 1 063 077 | 6/2000 |
| FR | 1.554.475 | 12/1968 |
| JP | 54-90266  | 7/1979 |

* cited by examiner

*Primary Examiner*—Yogendra Gupta
*Assistant Examiner*—Thu Khanh T Nguyen
(74) *Attorney, Agent, or Firm*—Sutherland Asbill & Brennan LLP

(57) ABSTRACT

The device for thermoforming an object presenting an undercut portion. The device may include a thermoforming mold having a base portion and at least two undercut-forming portions in the vicinity of an end; a countermold; and a moving thermoforming piston. The device further may include holding means suitable for holding the rim of the object relative to the countermold, and, in order to unmold the object, said portions of the mold and the holding means are suitable for being controlled in a sequence in which the undercut-forming portions are moved apart, the holding means are active and hold the object against the countermold, and at least the base portion of the mold is spaced apart from the countermold while the holding means are active.

22 Claims, 9 Drawing Sheets

DEVICE AND METHOD FOR THERMOFORMING AN OBJECT HAVING A BACK DRAFT PORTION

The present invention relates to a device for thermoforming an object presenting an undercut portion and a base portion, the device comprising: a thermoforming mold having a base portion and at least two undercut-forming portions in the vicinity of an open end; a countermold having an end that is suitable for co-operating with said end of the mold so as to clamp a piece of thermoplastic material thereagainst and so as to co-operate with said portions of the mold to define a thermoforming cavity; and a thermoforming piston that is mounted to move between a thermoforming active position in which it penetrates into said cavity and an inactive position in which it is situated outside said cavity, the two undercut-forming portions of the mold being suitable for being moved apart so as to enable the object to be unmolded.

In the object that is to be thermoformed by a device of the invention, the undercut portion presents diametrical dimensions that are smaller than the diametrical dimensions of the base portion. For example, the object can be a bottle-shaped receptacle whose neck forms the undercut portion. It can also be a receptacle having a substantially frustoconical side wall that tapers going towards the opening, or else a receptacle whose shape corresponds to the shape obtained from a sphere cut along a plane parallel to its equator, which is then situated between the resulting opening and the base of the receptacle.

When thermoforming objects that are free of undercuts, unmolding takes place merely by moving the mold away from the opening in the object by moving it in translation parallel to the movement of the thermoforming piston. When thermoforming objects presenting undercuts, molding is more complicated and requires the use of a mold made up of a plurality of portions.

BACKGROUND OF THE INVENTION

Thus, FR 2 795 360 recommends using a mold having two undercut-forming portions and one base portion. For unmolding, firstly the two undercut-forming portions are moved apart, and the thermoformed object is held against the base portion of the mold by suction, said base portion being provided with suction ducts. Said base portion can then be moved to extract the object from the zone in which the undercut-forming portions of the mold are situated, in order to make it accessible by pick-up means that make it possible to transfer said object to the outlet of the device.

That known device is relatively complicated because it implements holding the object by suction against the base of the mold. The effectiveness of that suction must be excellent in order to enable the object to be held correctly while the base portion of the mold is being moved.

In particular, in order to avoid the risks of the object tipping over relative to said base portion, it is necessary for said base portion to cover the base portion of the object over a height that is sufficient. Once the base portion of the mold that is carrying the object has been moved far enough away from the undercut-forming portions of the mold, it is necessary to cause the suction to cease, and to separate the object relative to said base portion. This requires the object and the base portion of the mold to be moved relative to each other parallel to the direction in which the thermoforming piston is moved, in order to extract the base portion of the object from the base portion of the mold, and then requires the object to be transferred sideways by moving it away from the thermoforming tool.

Thus, the way the various parts move relative to one another is relatively complex, and, if it is assumed that the direction in which the thermoforming piston is displaced is vertical, the unmolding operation firstly requires the undercut-forming portions of the mold to be moved horizontally so that they move away from the undercut portion of the object, it then requires the base portion of the mold to be moved vertically over a first stroke sufficient to move the rim of the object away from the undercut-forming portions of the mold, and said base portion to be moved vertically or else the object to be moved vertically relative to said base station over a second stroke sufficient to unmold the base portion of the object relative to the base portion of the mold, and finally, it requires the object to be transferred horizontally. In addition, in general, the entire mold (including the undercut-forming portions must be capable of being moved over a small vertical stroke in order to clamp the thermoplastic material between the mold an the countermold.

FR 1 427 784 discloses another device in which, for unmolding an object presenting an undercut portion, firstly the undercut-forming portions of the mold are moved apart, and then the object is expelled from the base portion of the mold by an ejector piston whose head forms the base of the mold during thermoforming. During that expulsion, the object is merely carried by the head of the piston without being held relative to it, and there exists a risk that it might tip over or fall, thereby giving rise to wastage, or at least to reductions in manufacturing throughputs. In addition, the device of FR 1 427 784 is possible only when the mold and the countermold constitute respectively the bottom tool and the top tool of the thermoforming device. In other words, the object must be thermoformed downwards.

FR 2 256 818 discloses yet another device in which, after thermoforming an object from a strip of thermoplastic, a front portion of the mold, which portion closes said mold on the downstream side in the direction of advance of the strip, is moved away so that the strip can advance through one step by extracting the object that has just been thermoformed from the mold via the opening formed due to the front of the mold being opened. That device can be used only for thermoforming objects from a continuous strip of thermoplastic material.

SUMMARY OF THE INVENTION

An object of the invention is to propose a device for thermoforming objects presenting undercut portions that improves the above-mentioned prior art.

This object is achieved by the fact that the device further comprises holding means suitable for holding the object relative to the countermold, and by the fact that, in order to unmold the thermoformed object, said portions of the mold and the holding means are suitable for being controlled in a sequence in which the undercut-forming portions of the mold are moved apart, said holding means are active and hold the object relative to the countermold, and at least the base portion of the mold is spaced apart from the countermold while the holding means are active.

During the first stage of the sequence, in which stage the undercut-forming portions of the mold are moved apart, the object that has just be thermoformed continues to be held between the countermold and the base portion of the mold. Moving the undercut-forming portions of the mold apart makes a portion of the wall of the object (e.g. a rim or a projecting portion on the object) accessible, and said object can thus be held relative to the countermold by holding means. In this situation, the object can be totally unmolded by moving the base portion of the mold relative to the countermold. It can then be picked up by pick-up means so as to be removed from the thermoforming device, e.g. by being disposed in the next station, which is, for example, a filling station, of an installation including said device.

The way in which the various parts of the mold move during thermoforming is extremely simple and can be achieved rapidly. It is not necessary to move the object relative to the countermold while it is being unmolded, and the object can be securely held against the countermold without any of the risks of tipping that exist with the devices of FR 2 795 360 and FR 1 427 784. In particular, for unmolding, it is possible to move only the portions of the mold, without there being any need to move the object that has just been thermoformed.

The invention applies both to a device in which the mold constitutes the bottom thermoforming tool and to a device in which the mold constitutes the top tool. In addition, the device of the invention applies to thermoforming objects from distinct pieces of thermoplastic (one piece per object), e.g. constituted by pellets of thermoplastic material.

Advantageously, the undercut-forming portions of the mold are constrained to move with the base portion of the mold.

The various portions of the mold are then interconnected so that the undercut-forming portions can be moved apart without moving the base portion of the mold, and so that finally moving the base portion in order to move it away from the object held against the end of the countermold makes it possible for complete unmolding to be achieved, the base portion of the mold taking the undercut-forming portions away with it. This also facilitates the operation of closing the mold before thermoforming another object because, for this purpose, the two undercut-forming portions can be moved towards each other to define a closed inside outline, a piece of thermoplastic material can be disposed on the end of the countermold or on the end of the mold, and said piece can be clamped between the countermold and the mold by moving the entire mold vertically towards the countermold.

Advantageously, the mold and the countermold are suitable for being moved relative to each other in order to place their respective ends out of contact before the two undercut-forming portions of the mold are moved apart.

This movement can take place over a short stroke, e.g. of in the approximate range a few tenths of a millimeter to 1 or 2 millimeters. This makes it possible to move the undercut-forming portions of the mold apart without them rubbing on the end of the countermold.

Advantageously, the holding means comprise holding members suitable for being moved between an active position in which they are suitable for holding the object relative to the countermold and an inactive position.

In one embodiment, for the purpose of unmolding the object, said portions of the mold and the holding means are suitable for being controlled in a sequence in which, in succession, the undercut-forming portions of the mold are moved apart, the holding means go from an inactive position to an active position in which they hold the object relative to the countermold, and the base portion of the mold is moved apart from the countermold.

In which case, the holding means are inactive during the thermoforming and go into their active position only after said thermoforming, e.g. by being moved in the join plane between the undercut-forming portions of the mold, which join plane is then open.

In another embodiment, the holding means are suitable for taking up an inactive position and an active position in which they define a portion of the wall of the thermoforming cavity and in which they are suitable for holding the object relative to the countermold, and said holding means are suitable for occupying their active position while the object is being thermoformed, and while the undercut-forming portions of the mold are being moved apart.

In which case, the holding means contribute to giving the wall of the object its shape, and so long as they occupy their active position, they hold the object securely by their shape being complementary to the shape of the object.

The invention also provides a method of thermoforming an object having an undercut portion and a base portion, the method consisting in: using a thermoforming mold having a base portion and at least two undercut-forming portions in the vicinity of an open end; clamping a piece of thermoplastic material by means of the end of a countermold against said end of the mold; defining a thermoforming cavity with said mold portions; bringing a thermoforming piston into a thermoforming active position in which it penetrates into the cavity of the mold from an inactive position in which the piston is situated outside said cavity; and, in order to enable the object to be unmolded, moving said undercut-forming portions of the mold apart.

FR 2 795 360 describes a method in which, after the undercut-forming portions of the mold have been moved apart, the object that has just been thermoformed is held against the base portion of the mold by suction, and said base portion is moved with the object that it carries. That holding is relatively unreliable and a risk exists that the object might tip over or fall while the base portion of the mold is being moved. In addition, that movement must be followed by an operation in which the object is unmolded relative to said base portion.

FR 1 427 784 discloses a method in which, after the undercut-forming portions have been moved apart, the object is expelled by means of an ejector piston. As indicated above, such expulsion might also cause the object to tip over or fall. In addition, that object can be thermoformed downwards only.

FR 2 256 818 describes a method in which, after the front of the mold has been opened, the strip of thermoplastic carrying the object that has just been thermoformed is caused to advance in order to unmold said object. Naturally, that method applies only to objects that are thermoformed from a continuous strip.

An object of the invention is to propose a method that improves the methods of the above-mentioned prior art.

This object is achieved by the fact that, for the purpose of unmolding the thermoformed object, it further consists in moving the undercut-forming portions of the mold apart, and in moving the base portion of the mold away from the countermold while holding the object relative to the countermold.

Advantageously, while the object is being held relative to the countermold, the undercut-forming portions and the base portion are moved away from the countermold.

Advantageously, before the undercut-forming portions of the mold are moved apart, the mold and the countermold are moved relative to each other so as to place their respective ends out of contact.

Advantageously, in order to hold the object relative to the countermold, holding means are moved from an inactive position to an active position.

In one embodiment, this movement takes place after the undercut-forming portions of the mold have been moved apart.

In another embodiment, this movement takes place before the object is thermoformed, and said holding members are returned to their inactive position only once the undercut-forming portions of the mold have been moved apart.

In which case, advantageously, the object is thermoformed from a pellet of thermoplastic material, and, before said object is thermoformed, the periphery of said pellet is shaped by means of the holding members.

The pellet reaches the thermoforming device after it has been heated and conveyed, which might have modified its shape. The shaping thus rectifies the periphery of the pellet prior to thermoforming. It is advantageously performed by causing the holding members to go from their inactive position to their active position, and it is advantageously accompanied by or followed by die-stamping of the edge of the pellet.

These and other features of the present application will become apparent to one of ordinary skill in the art upon review of the following detailed description when taken in conjunction with the drawings and the appended claims.

BRIEF DESCRIPTION OF THE DRAWINGS

The invention will be better understood and its advantages will appear more clearly on reading the following detailed description of embodiments given by way of non-limiting example. The description refers to the accompanying drawings, in which.

DETAILED DESCRIPTION OF THE INVENTION

Figure 1:
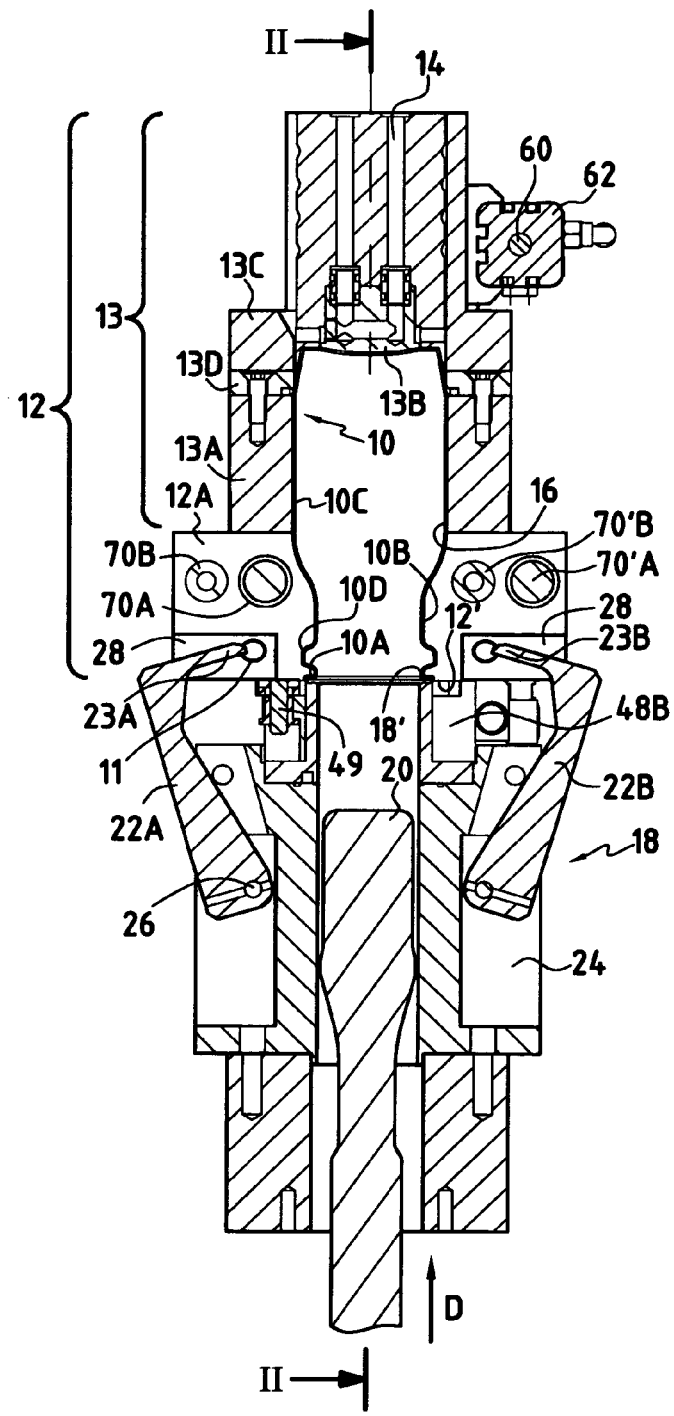
FIGS. 1, 3, and 5 are analogous vertical section views showing a first embodiment of a device of the invention in three successive states, after an object has been thermoformed in the mold.

The device shown in the figures serves to thermoform an object 10 which, in the example shown is in the form of a small bottle. The object presents a rim 10A, a neck undercut portion 10B and a base portion 10C. As indicated in the drawing, it can be seen that said object optionally also has an annular rib forming a collar 10D between the rim 10A and the neck 10B. Said collar can, for example, co-operate with a tamper-proofing band on the cap of the receptacle.

The device includes a thermoforming mold 12 which has two undercut-forming portions, respectively 12A and 12B, whose free ends define the open end 12' of the mold. Said mold also includes a base portion 13 which, in the example shown, is made up of a plurality of pieces comprising a portion 13A whose inside periphery is cylindrical, a base portion proper 13B, a casing portion 13C disposed around said piece 13B and secured thereto, and a ring 13D via which the portions 13C and 13A are secured together.

In this example, the base portion 13B is cooled by means of a fluid circulating in cooling ducts 14 with which it is provided.

In general, regardless of the number of pieces making up the mold, said mold includes at least two undercut-forming portions and one base portion.

The device also includes a countermold 18 that has one end 18' suitable for co-operating with the end 12' of the mold to clamp a piece of thermoplastic material thereagainst, and a thermoforming piston 20 mounted to move between a thermoforming active position (not shown) in which it penetrates into the cavity 16 and an inactive position (as shown) in which it is outside said cavity.

The various portions of the mold, as considered together with the countermold 18, define a thermoforming mold 16.

In the example shown, the object is thermoformed upwards, i.e. the countermold and the mold respectively form the bottom thermoforming tool and the top thermoforming tool. The reverse configuration could be used for thermoforming the object 10 downwards.

The device also includes two hinged arms 22A and 22B that are hinged to the countermold.

The device includes holding means that comprise fingers movable in the join plane in which the undercut-forming portions of the mold join. In the example shown, said fingers are formed by the ends 23A and 23B of the hinged arms 22A and 22B. By examining FIG. 8, it can be understood that the wall of the countermold 18 is provided with recesses 24 enabling said hinged arms to be mounted to pivot about their hinge pins 26. Said pins extend perpendicularly to the direction D in which the thermoforming piston moves.

Figure 8:
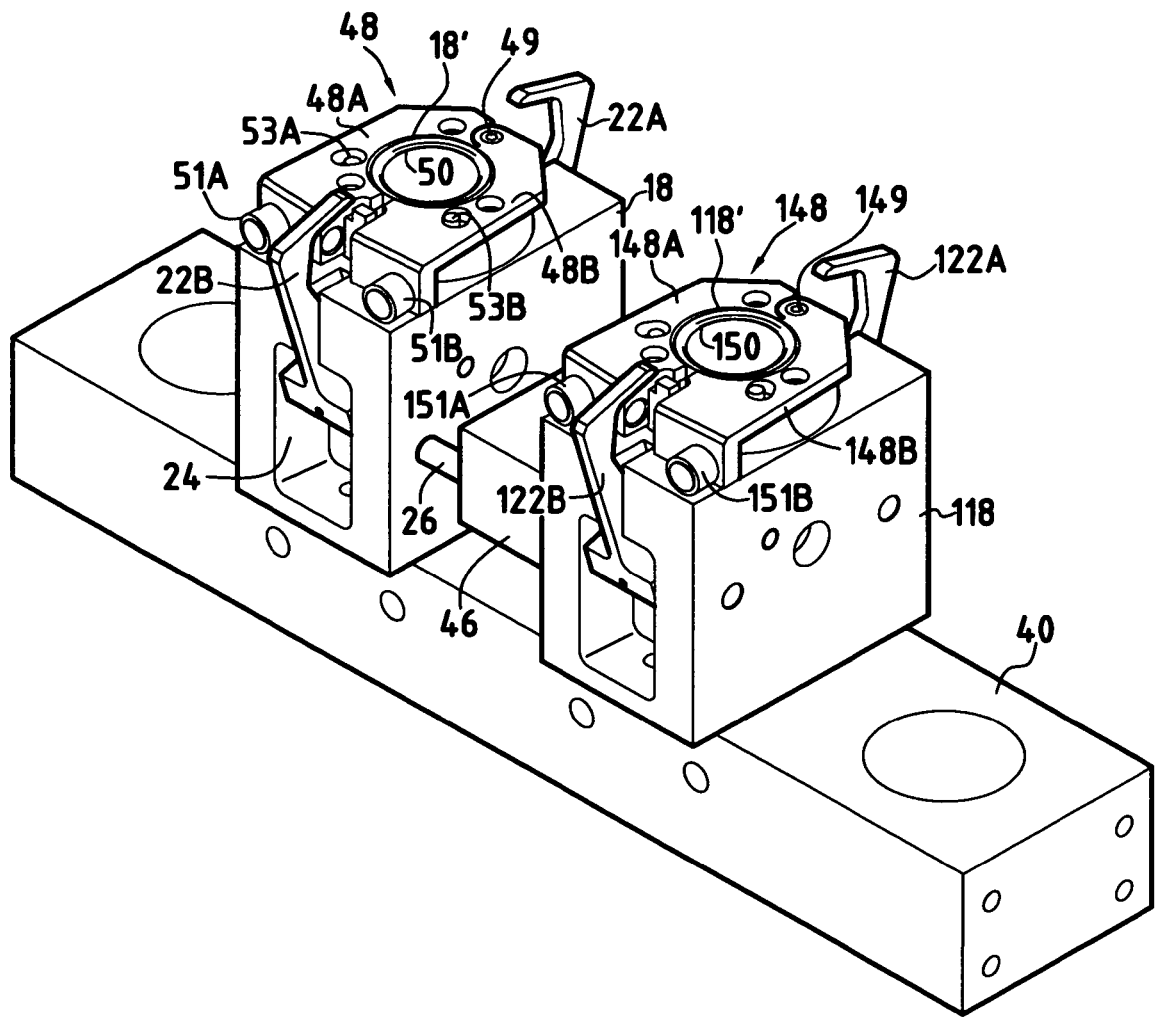
FIG. 8 is a perspective view of the bottom portion of the system which has two thermoforming counter-tools.

In FIGS. 1 and 8, the holding means constituted by the fingers 23A and 23B are in their inactive position in which they are spaced apart from the end 12' of the countermold. The fingers 23A and 23B are then received in part in setbacks 28 (FIG. 1), each of which is provided in part in each of the two undercut-forming portions 12A and 12B, in the vicinity of the end 12' of the mold.

Figure 2:
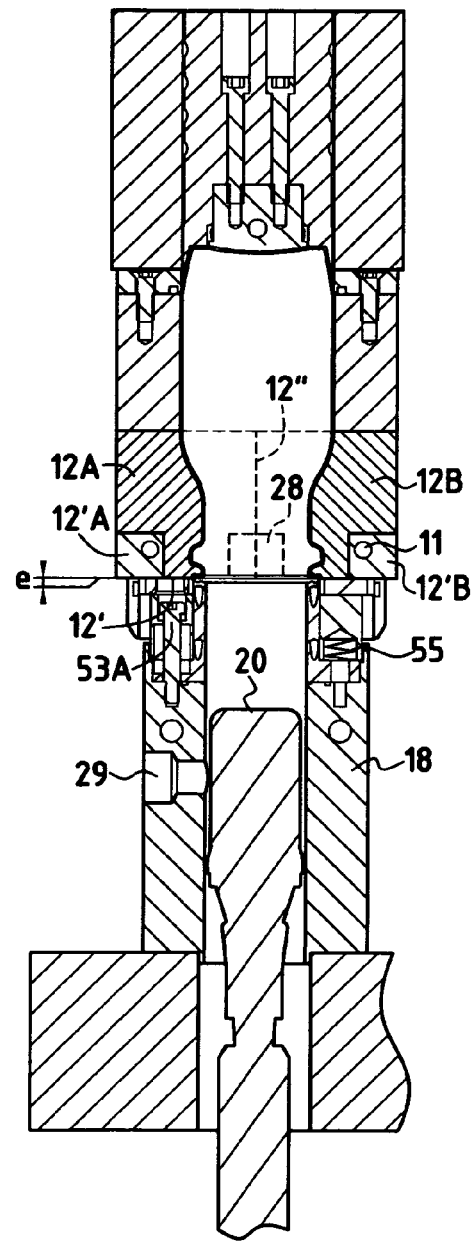
FIGS. 2, 4, and 6 are sections respectively on line II-II of FIG. 1, on line IV-IV of FIG. 3, and on line VI-VI of FIG. 5.
Figure 9:
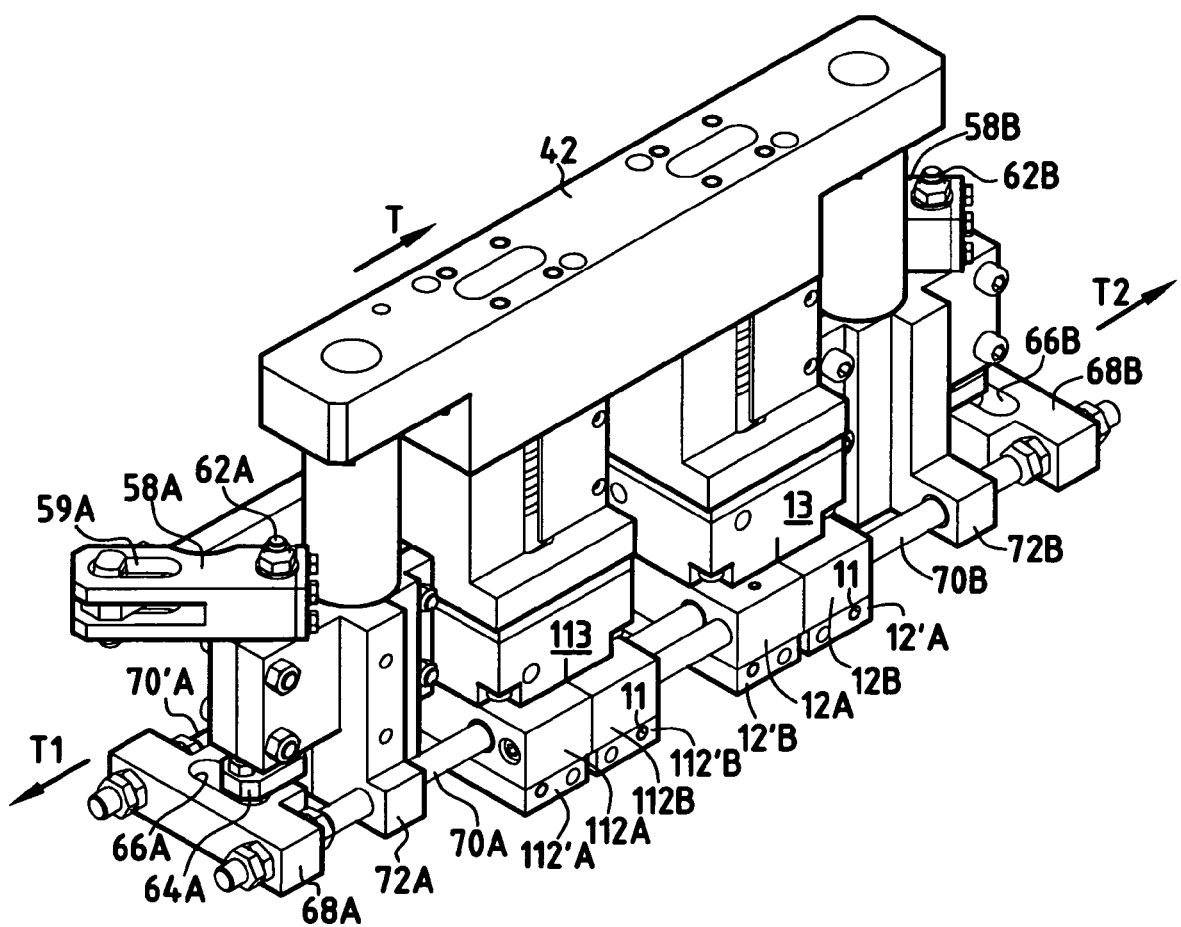
FIG. 9 is a perspective view showing the top portion of this system that includes two thermoforming molds.

As can be understood by examining, for example, FIGS. 2 and 9, the undercut-forming portions 12A and 12B carry cooling plates, respectively 12'A and 12'B, which are provided with bores 11 through which the cooling fluid, e.g. air, can flow. It is between said cooling plates that the above-mentioned setbacks 28 are provided.

In dashed lines, FIG. 2 shows the join plane 12'' between the undercut-forming portions 12A and 13B of the mold, and also the setback 28 in which the finger 23A is disposed.

In FIGS. 1 and 2, the mold is closed, i.e. the undercut-forming portions 12A and 12B are closed against each other in their join plane, and their inside peripheries co-operate with the inside periphery of the base portion and with the end 18' of the countermold to define the above-mentioned cavity 16. In this situation, a piece of thermoplastic material such as a pellet can be clamped between the facing edges of the mold and of the countermold, before being deformed by the thermoforming piston so as to be brought into the cavity 16. It is pressed against the wall of the cavity by blowing air through the orifice 29 situated in the countermold 18.

Naturally, prior to being deposited between the mold and the countermold, the pellet of thermoplastic material is subjected to a heating step inside a heater box and to a transfer step for transferring it from the heating station to the thermoforming device. Any heater and transfer means can be devised for disposing the hot pellet between the mold and the countermold. In particular, inspiration can be taken from the means disclosed by FR 2 766 123 and by FR 01 11031 (not yet published on the date of filing of the present patent application).

In FIGS. 1 and 2, the receptacle 10 has just been thermoformed, and the piston 20 has just been returned to its low position, inside the countermold. The receptacle 10 must then be unmolded.

Figure 3:
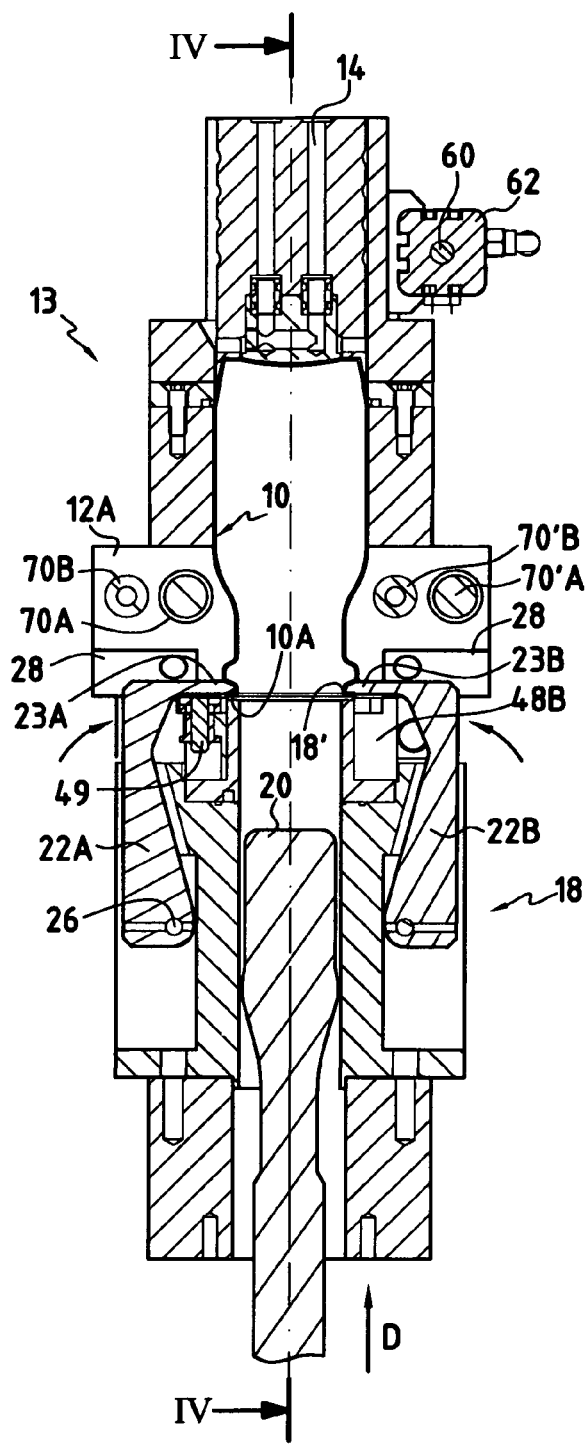
Figure 4:
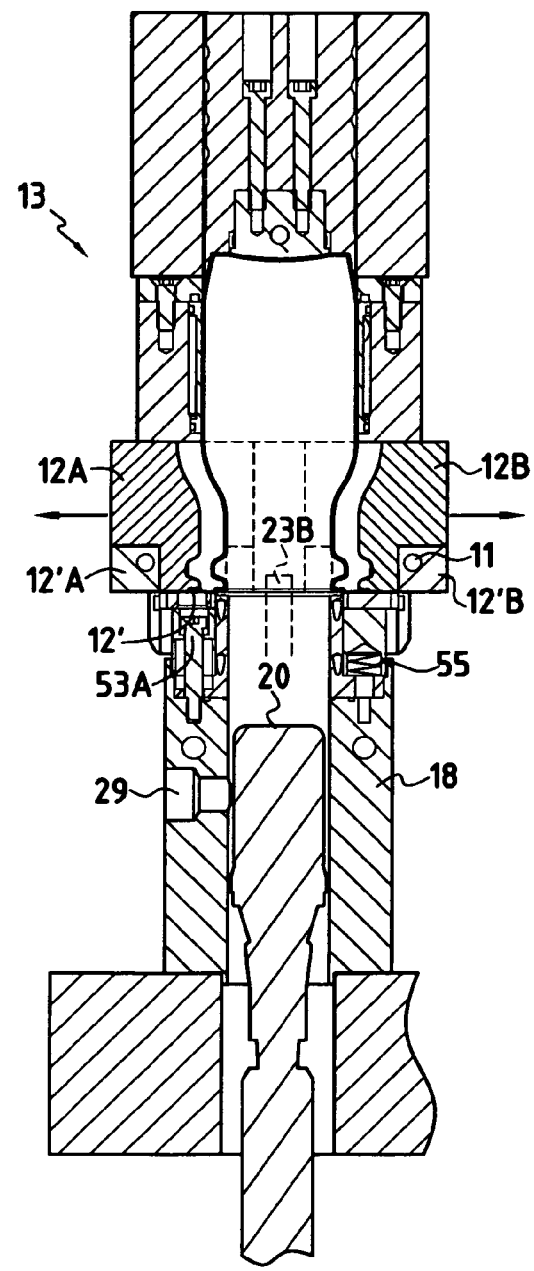
Figure 5:
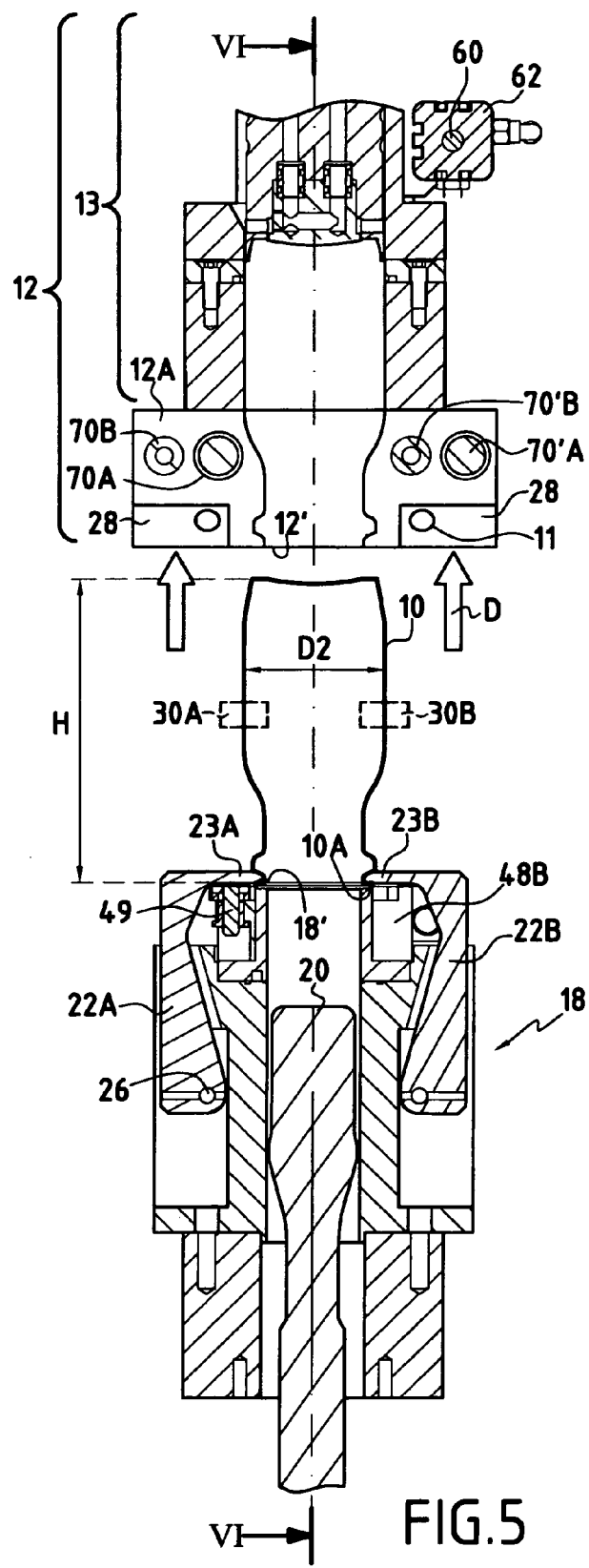
Figure 6:
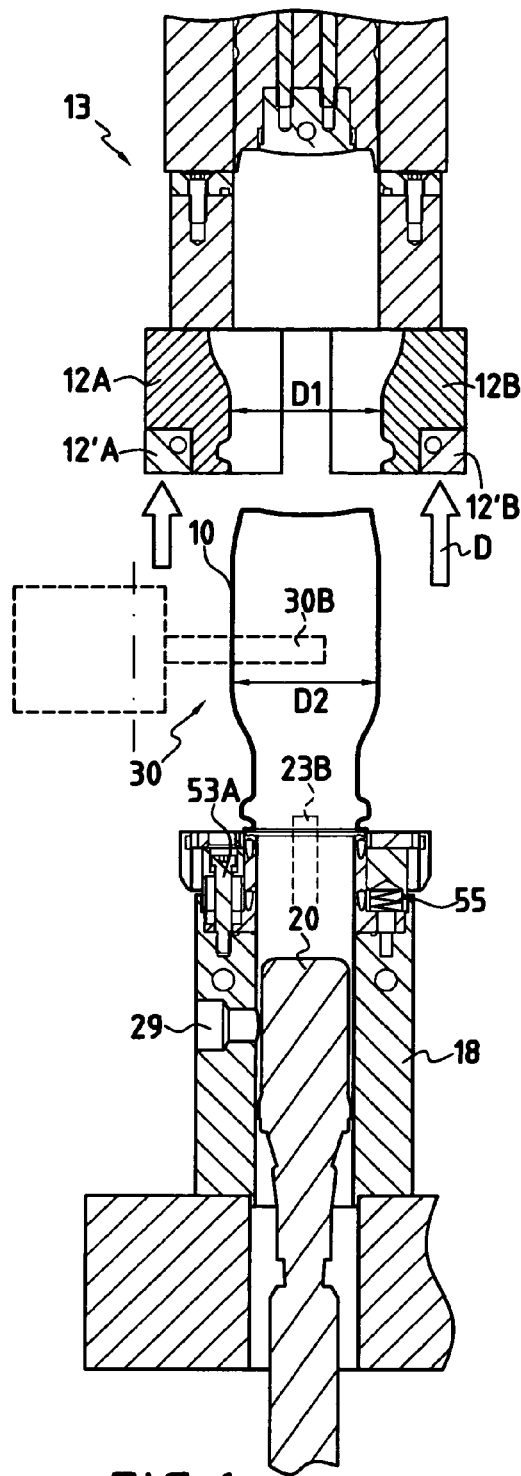

Unmolding takes place by moving the various portions of the mold relative to each other in a sequence whose successive stages are shown by FIGS. 3 and 4 firstly, and by FIGS. 5 and 6, secondly.

FIG. 4 shows that the two undercut-forming portions 12A and 12B have been moved apart. Making advantageous use of the resulting gap, it has been possible for holding means to be activated, and it can be seen in FIG. 3 that the arms 22A and 22B have pivoted about their respective pins 26 so that their ends forming the fingers 23A and 23B are situated above the end 18' of the countermold. The holding means are thus activated by moving into the gap opened up between the undercut-forming portions 12A and 12B due to them being moved apart. In this position, the fingers 23A and 23B hold the rim 10A of the receptacle 10 against the end 18' of the countermold. During this stage in which the undercut-forming portions 12A and 12B are moved apart and the holding means 23A and 23B are driven, the receptacle 10A continues to be held correctly because the base portion 10C of the mold has not moved significantly. There is therefore no risk of the receptacle 10 tipping over or falling. As soon as the portions 12A and 12B have been moved apart sufficiently, it is possible to control the arms so that they come to hold the rim of the receptacle against the end of the countermold.

It is then possible to implement the next stage of the sequence, shown in FIGS. 5 and 6. This stage consists in moving at least the base portion 13 of the mold so as to unmold the receptacle 10 while holding said receptacle by means of the fingers 23A and 23B which continue to clamp the rim 10A of the receptacle against the end 18' of the countermold.

In this example, it is with the rim 10A of the receptacle 10 that the holding fingers co-operate. When such a rim exists, said rim constitutes a projecting portion that can easily be retained by the fingers. However, they can also be engaged behind the collar 10D.

This system can also apply to objects without rims or without significantly projecting portions, e.g. by increasing the area of contact between the ends of the holding fingers and the wall of the object, it being possible for said ends to be provided with concave shapes adapted to match the outline of the object. It is also possible to imagine making provision for the fingers, in their active position, to deform the wall of the object elastically in order to hold it more securely.

In a first possible variant, during this last stage of the unmolding, only the base portion 13 of the mold is moved in the direction D in which the thermoforming piston is moved so as to move it away from the countermold, while the undercut-forming portions are merely moved apart sufficiently by being moved in relative translation perpendicularly to said direction D in order to enable the receptacle then to be picked up by the pick-up means such as a grab 30 and to be moved away from the thermoforming tool by being carried by said pick-up means.

In an advantageous variant shown in the drawings, the undercut-forming portions 12A and 12B of the mold are constrained to move with the base portion 13.

In which case, during the first stage, the two undercut-forming portions 12A and 12B are merely moved apart so as to define between them minimum diametrical dimensions D1 that are at least equal to the maximum external diametrical dimensions D2 of the receptacle 10, also defined by the dimensions of the cavity 16. Under such conditions, in order to achieve the unmolding, it suffices to move the entire mold in the direction D over a distance sufficient for the end 12' of the mold to be spaced apart from the end 18' of the countermold by a distance greater than the total height H of the receptacle, as shown in FIGS. 5 and 6. In this situation, since the receptacle is still held against the end of the countermold by the fingers 23A and 23B, it suffices to pick it up using pick-up means such as the arms 30A and 30B of a grab 30, e.g. of the type shown diagrammatically in FR 2 766 123 and, only then, to cause the holding fingers to return to their inactive position in which they are spaced apart from the end of the countermold, in order to move the pick-up means holding the receptacle 10 so as to remove said receptacle from the thermoforming device by placing it, for example, in a filling station of an thermoforming and filling installation.

Thus, the pick-up means 30A and 30B and the holding means 23A, 23B are adapted to be controlled such that the pick-up means 30A, 30B pick up the receptacle 10 while the holding means 23A, 23B hold said receptacle against the end 18' of the countermold 18, then the holding means 23A, 23B cease to hold the receptacle and the pick-up means 30A, 30B are moved to bring said receptacle outside the thermoforming device.

Advantageously, the mold 12 and the countermold 18 are suitable for being moved relative to each other so as to place their respective ends 12' and 18' out of contact before the two undercut-forming portions 12A and 12B are moved apart. This variant is not shown, but it can be understood, by examining FIG. 2, that it suffices to move the mold and the countermold relative to each other in the direction D so as to move their respective ends apart by a small distance e, e.g. of about a few tenths of a millimeter, without yet performing the unmolding, before moving the undercut-forming portions of the mold relative to each other as shown in FIGS. 3 and 4.

Figure 7:
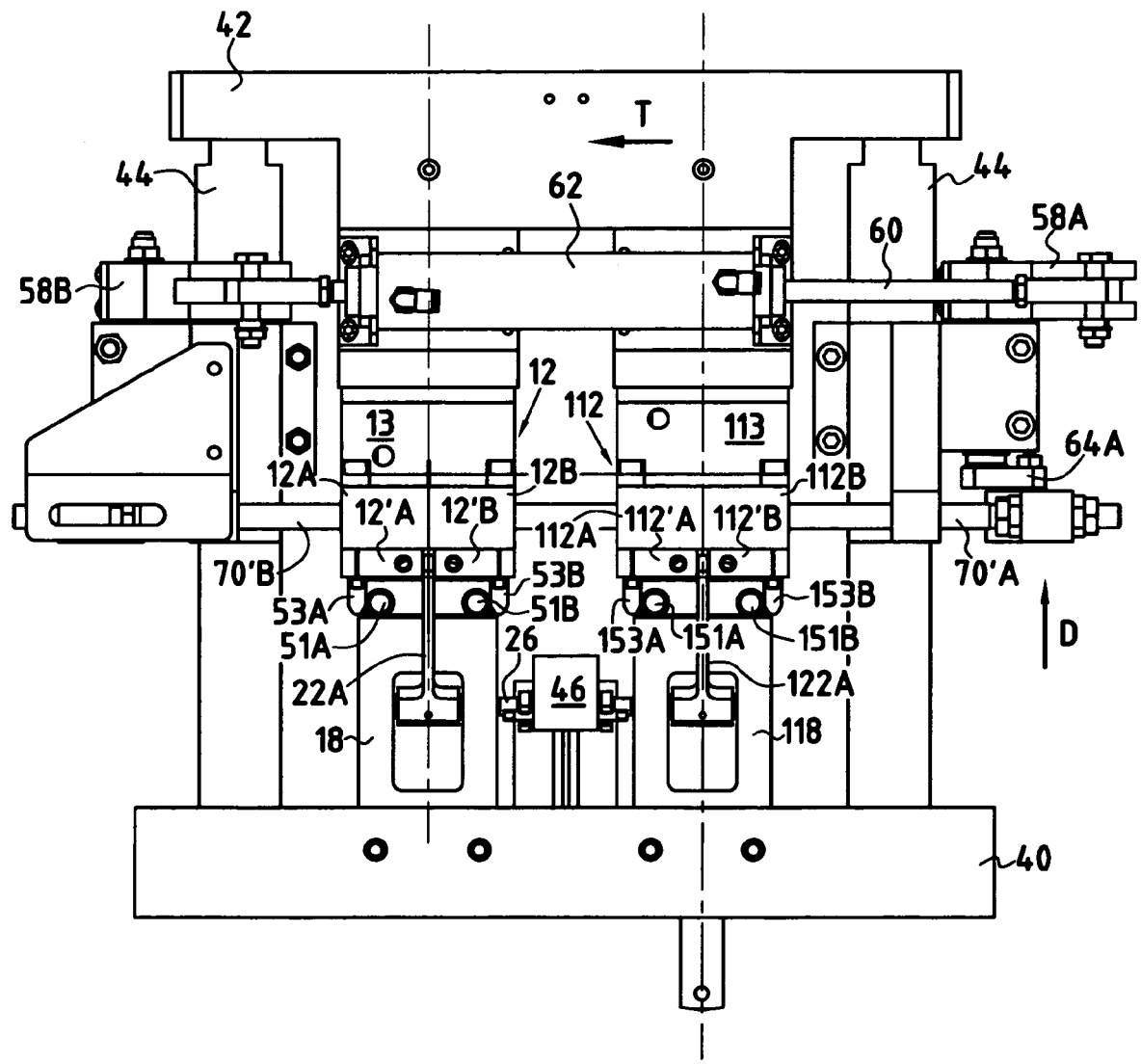
FIG. 7 is an elevation view of a system using two devices of the first embodiment of the invention.

FIG. 7 shows a thermoforming system using two devices of the above-described type, it naturally being understood that a different number of devices (one or more than two) could be used in the same system. In FIG. 7, the left device is given the references used in FIGS. 1 to 6, while the right device is given the same references plus 100.

The two countermolds 18 and 118 are carried by the same bottom support plate 40, while the two molds 12 and 112 are carried by a common top support plate 42. It should be recalled that the configuration of the molds and countermolds could be reversed, it being possible for the molds to be situated under the countermolds.

The plates 40 and 42 are mounted to move relative to each other while being guided by guide columns 44. By means of actuators (not shown), they can be moved apart so as to move the molds and countermolds relative to one another in the direction D. By examining FIGS. 7 and 8, it can be seen that the pivot pin 26 of the arms 22A and 122A extends in the space provided between the two blocks of countermolds 18 and 118, and that an actuator 46 co-operates with said pin to cause the arms 22A and 122A to pivot simultaneously. Said actuator 46 also co-operates with the pin 26 that interconnects the arms 22B and 122B between the two blocks of countermolds so as also to cause them to pivot simultaneously. Thus, controlling the actuator 46 simultaneously places the holding means of the two countermolds in their respective active positions or else in their respective inactive positions.

FIG. 8 shows said holding means in their inactive position. FIG. 8 also shows that each of the ends 18' and 118' of the countermolds 18 and 118 carries a shaping clamp, respectively 48 and 148, each of which has two arms, respectively 48A & 48B and 148A & 148B. When the mold is separated from the countermold, the arms of said clamps are moved apart so as to open up a relatively wide opening at the end of the countermold. A pellet of thermoplastic material, even if it is slightly deformed after it has been heated in the heater box, can thus be disposed at the end of the countermold by being laid on the die-stamping ledge respectively 50 and 150 formed at the end of the countermold, respectively 18' and 118', inside the opening opened up between the arms of the shaping clamp. Said arms are mounted to pivot relative to each other about a pin 49, 149 that is parallel to the direction D in which the thermoforming piston moves. Said pin 49 can also be seen in FIGS. 1, 3, and 5.

The end of each of the arms 48A and 48B that is opposite from their pin 49 carries a wheel, respectively 51A and 51B. Similarly, the end of each of the arms 148A and 148 carries a wheel, respectively 151A and 151B. The end of the mold 12 carries fingers, respectively 53A and 53B (see FIG. 7) which, while the mold 12 and the countermold 18 are being brought towards each other for the purpose of clamping between them the pellet of thermoplastic material, co-operate, via ramps with which they are provided, with the wheels 51A and 51B to close the clamp 48 by moving its two arms towards each other. Similarly, the end of the mold 112 carries analogous fingers 153A, 153B suitable for co-operating with the wheels 151A and 151B.

As described in Patent Application FR 01 11031, the ends of the mold and of the countermold can form die-stamping means for the edges of the pellet of thermoplastic material.

The extent to which the arms of the clamp 48 can open can be limited by abutment means, respectively 53A and 53B formed by stationary lugs penetrating into windows provided in the arms. In addition, said arms are urged continuously back towards their spaced-apart position by resilient means (not shown). The clamp 48 can be mounted on springs 55 (see FIGS. 2, 4, and 6) which urge it continuously back into its high position shown in FIG. 8, in which the thickness of a pellet can be received in the thickness of the arms 48A and 48B, which springs extend beyond the die-stamping edge 50 and can be compressed while the mold is closed against the countermold so as to bring the top face of the clamp substantially into the same plane as the top end 18' of the countermold, as can be seen in FIGS. 1 to 6.

With reference to FIGS. 7 to 9, the top portion of the thermoforming system that comprises the molds of the two thermoforming devices is described in more detail below. It can be seen that the system includes links, respectively 58A and 58B which are interconnected via a common tube 60 whose two ends co-operate with respective ones of oblong slots, such as the slot 59A, provided in each of the two links. The tube 60 is moved by an actuator 62 that can also be seen in FIGS. 1, 3, and 5. At its end opposite from the slot that co-operates with one end of the tube 60, each link carries a vertical pin, respectively 62A and 62B which is driven in rotation by the link moving so as also to drive in rotation an eccentric such as the eccentric 64A that can be seen in FIGS. 7 and 9. This eccentric is provided with a lug that co-operates with a slot, respectively 66A and 66B, formed in a slat, respectively 68A and 68B. The slat 68A carries two horizontal displacement bars, respectively 70A and 70'A, and the slat 68B also carries two horizontal displacement bars, respectively 70B and 70'B. The bars 70A and 70'A pass through the undercut-forming portions 12A, 12B, and 112A, the undercut-forming portions 12A and 112A being constrained to move with bars 70A and 70'A, while said bars are mounted to slide freely relative to the portion 12B. Similarly, the bars 70B and 70'B pass through the undercut-forming portions 112B, 112A and 12B, the portions 112B and 12B being constrained to move with the bars 70B and 70'B, while said bars are mounted to slide freely in the portions 112A.

FIGS. 7 and 9 show the configuration in which the undercut-forming portions 12A & 12B and 112A & 112B are closed against one another respectively. When the actuator 62 is operated, the rod 60 can be moved in the direction T indicated in FIGS. 7 and 9, thereby pivoting the eccentrics driven by the pins 62A and 62B in the slots 66A and 66B, and moving the slats 68A and 68B correspondingly. Since the dispositions of the eccentrics in their respective slots 66A and 66B are reversed, the movement causes the slats 68A and 68B to be moved apart by moving them respectively in the direction T1 and in the direction T2 (which, in this example, is identical to the direction T). As a result, the undercut-forming portions 12A and 12B are moved apart, and the undercut-forming portions 112A and 112B are also moved apart. Bars 70A, 70B, 70'A, 70'B are carried by a support portion, respectively 72A and 72B, which is itself carried by the support plate 42. Thus, the undercut-forming portions of the molds are constrained to move vertically with the base portions 13 and 113 of the molds.

A second embodiment of the invention is described below with reference to FIGS. 10 to 13.

Figure 10:
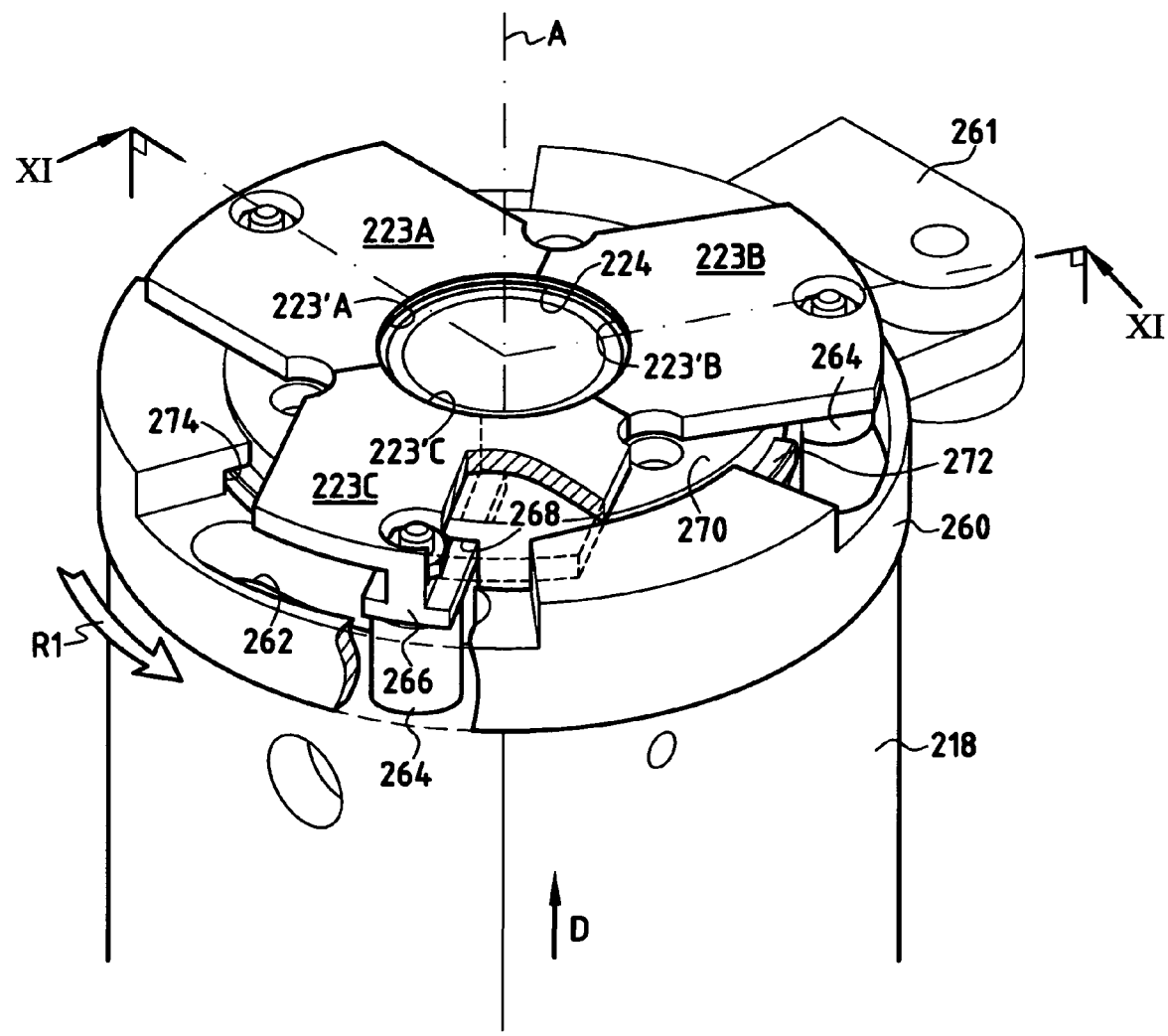
FIG. 10 is a fragmentary perspective view showing the bottom portion of a device of a second embodiment of the invention.
Figure 11:
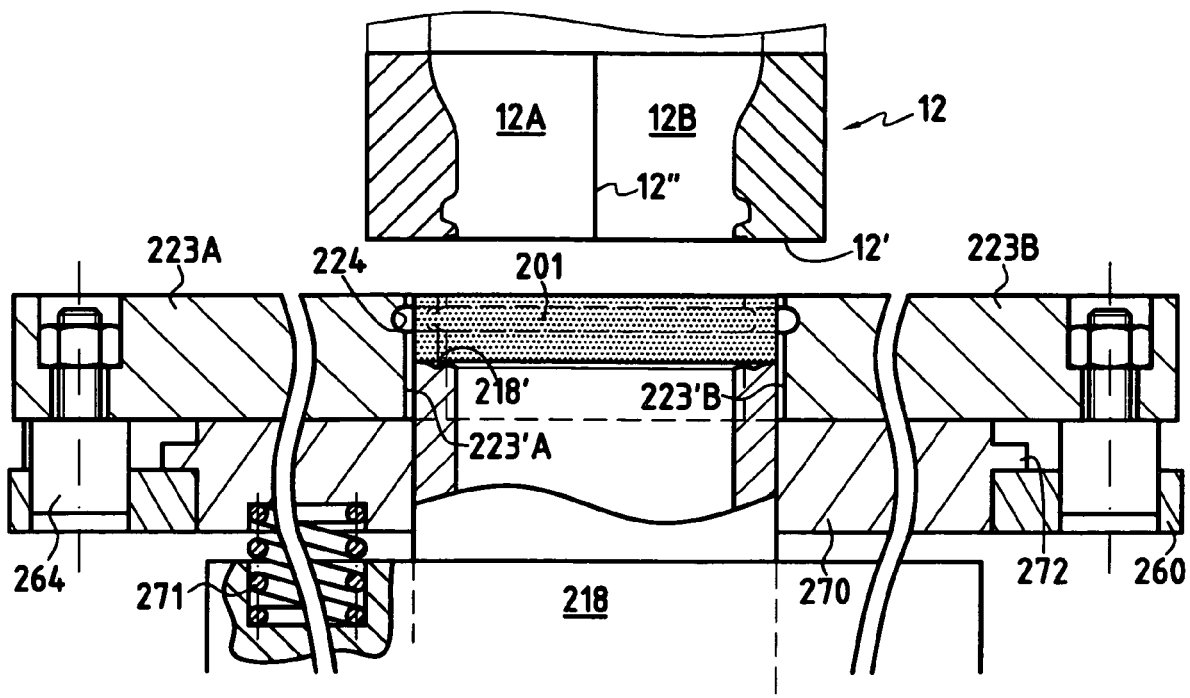
FIGS. 11, 12, and 13 are analogous fragmentary vertical section views diagrammatically showing a device of the second embodiment of the invention in three successive states before an object is thermoformed in the mold.
Figure 12:
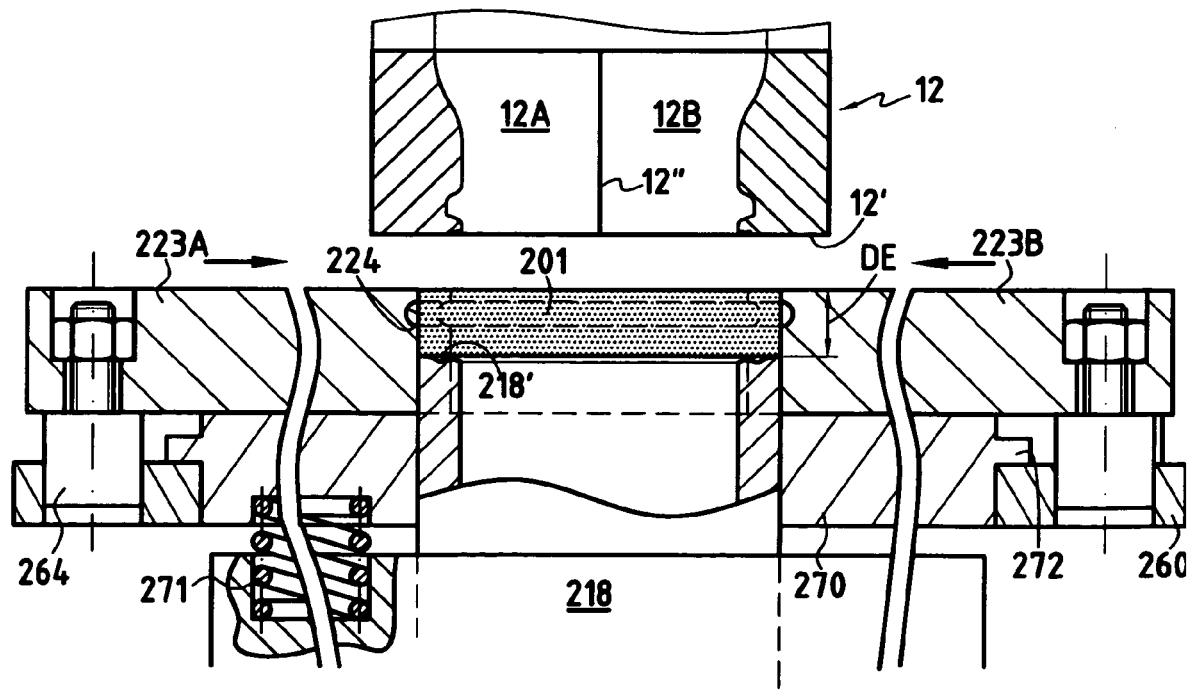
Figure 13:
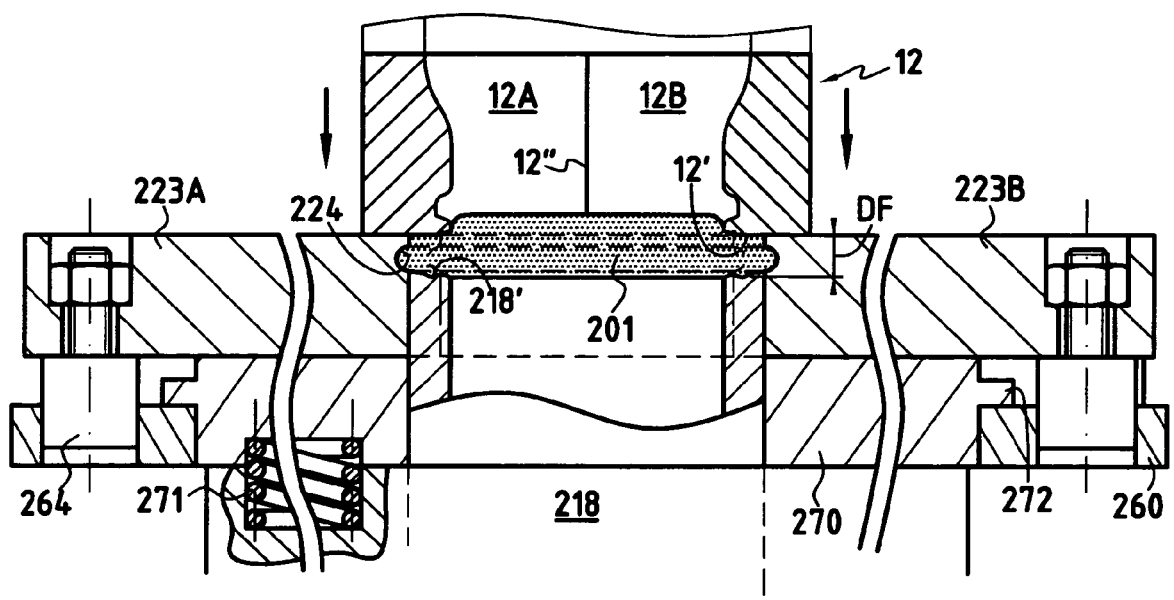

FIG. 10 shows the top portion of a countermold 218 that carries holding members 223A, 223B, and 223C. Said holding members present edge portions, respectively 223'A, 223'B and 223'C which, when the holding members shown in FIG. 10 are in the active position, define a closed outline at the end of the countermold. As can be seen in FIGS. 11 to 13, a pellet of thermoplastic material 201 disposed on the end 218' of the countermold 218 can be wedged in said closed outline for the purpose of forming an object such as the receptacle 10 of the preceding figures. The holding members are constituted by tabs or fingers that can be displaced radially relative to the axis A of the countermold 218, said axis being parallel to the direction D in which the thermoforming piston is moved. For this purpose, a cam-carrying ring 260 disposed at the end of the countermold 218 can be driven in rotation by an actuator of which only the head 261 is shown. Said ring is provided with slots 262 forming cams in which wheels 264 are disposed, each wheel being secured to a respective holding member 223A, 223B, or 223C. The slots 262 form eccentric portions with which said wheels co-operate, and it can be understood that, by turning the ring 260 in the direction R1, it is possible to cause the edges of the holding members to be moved away from the axis A so as to bring said members into their inactive position, whereas rotating the ring in the opposite direction causes the edges of the holding member to be moved towards each other so as to bring them into their active position shown in FIG. 10.

Between the two positions, the holding members move radially by being guided by guide means such as, for each guide member, a rectilinear rib 266 having an upside-down T-shaped section, for example, and being mounted to slide in a groove 268 which has a complementary section and which is formed in a central plate 270 above which the holding members are disposed. Said plate is substantially in the shape of a ring that surrounds the top end portion of the countermold inside which the thermoforming piston moves.

The plate 270 also makes it possible to guide the ring 260 as it turns. For this purpose, the outside periphery of said plate is provided with an annular rib 272 or with a plurality of segments of annular rib while, over its inside periphery that co-operates with said outside periphery, the ring 260 is provided with an annular groove 274 disposed around the rib 272.

As indicated diagrammatically in FIGS. 11 to 13, the plate 270 and the ring 260 that is carried by said plate, as well as the holding members 223A, 223B, and 223C, are supported relative to the body of the countermold by springs 271. The holding members are thus supported resiliently relative to the countermold between a wedging position which can be seen in FIG. 11 and in FIG. 12, and in which, with the mold being spaced apart from the countermold, said members project beyond the end of the countermold over a given projection distance DE, and a retracted position shown in FIG. 13 and in which said projection distance is reduced, optionally to zero.

In this example, in the retracted position shown in FIG. 13, the projection distance is reduced to a distance DF that is less than the distance DE without being zero.

Each of the edge portions 233'A, 223'B, and 223'C is provided with at least one piece in relief for anchoring into the thermoplastic material and, in the retraction position shown in FIG. 13, said piece in relief is situated in a region of the holding members that continues to project beyond the top end 218' of the countermold. Said piece in relief can be constituted by a recess or by a projection. In this example, it is an annular groove 224 that is made up of a plurality of groove portions, each of which is provided in the edge portion of a respective holding member. When, with the holding members in their active position, said edge portions define a closed outline, said groove portions together form a continuous groove 224.

Rather than providing a continuous groove, it is possible to provide a plurality of recessed portions in the edges of the holding members forming a plurality of recessed anchoring pieces in relief. It is also naturally possible to provide a plurality of projecting ribs or rib portions disposed so as to form a continuous annular rib when the holding members are in their active position.

Initially, with the holding members being in their inactive position which can be seen in FIG. 11, and into which each of them is moved relative to the active position shown in FIG. 10 by moving away from the axis, they define, as considered together, an opening of diameter greater than the diameter of the top end of the countermold.

Then as indicated by the arrows of FIG. 12, the holding members are brought into their active position so that their respective edge portions co-operate with the edge of the pellet 201. The closed outline defined by the edge portions of the holding members when they are in their active position corresponds to the outline of a portion of the receptacle that is to be thermoformed and, if the pellet has been slightly deformed, this step in which the holding members are moved towards their active position makes it possible to shape the periphery of the pellet in a manner such as to impart the desired shape to it.

At this stage, since the mold is still spaced apart from the countermold or, at least, is not exerting any pressure thereon, the holding members are still in their wedging position. As can be seen in FIG. 13, it is then possible to move the mold towards the countermold in order to clamp the pellet 201 between the facing ends of the countermold and of the mold. In moving in this way, the mold exerts a pressure on the holding members, thereby bringing them into their retracted position shown in FIG. 13. Naturally, this movement also affects the ring 260 and the plate 270.

Since the material of the pellet 201 is hot, it can then be deformed plastically and tends to fill the groove 224. This phenomenon also makes it possible to perform die-stamping on the edge of the pellet, thereby giving the edge portion of the thermoformed object its shape. In this situation, thermoforming is then performed conventionally by moving the thermoforming piston inside the cavity of the mold.

When the thermoforming operation is finished, the thermoformed object must be unmolded. For this purpose, as indicated above, and in accordance with the invention, the undercut-forming portions 12A and 12B of the mold are moved apart without moving the base portion of said mold. In this situation, the object that has just been thermoformed remains securely held due to the presence of the rib of thermoplastic material that has formed inside the groove 224. This opposes any untimely tearing away or tipping over of the object relative to the countermold.

Advantageously, before moving the undercut-forming portions of the mold relative to each other in this way, said mold is raised slightly so as to cause the pressure exerted by the mold on the countermold substantially to cease. Due to the presence of the above-mentioned springs 271, the holding members and the ring 260 and the plate 270 are then lifted slightly relative to the body of the countermold. The receptacle that has just been thermoformed thus moves slightly away from the end 218' of the countermold, but it remains securely held inside the closed outline defined by the edge portions of the holding members.

As indicated above, it is possible, by way of anchoring relief for facilitating holding of the thermoformed object by the holding means, to provide one or more projections formed on the edge portions of the holding means. In which case, when the holding members are brought into their active position as shown in FIG. 12, said projections tend to catch in the edge of the pellet of thermoplastic material. Then, when the mold is moved towards the countermold to reach the situation shown in FIG. 13, the projecting pieces in relief move relative to the pellet which fills the space defined between the facing ends of the mold and of the countermold.

In the second embodiment of the invention, the holding members are in their active position during the thermoforming and it can be understood from FIG. 13 that they then define a portion of the wall of the thermoforming cavity. More precisely, a portion of said cavity that is situated between the facing ends of the mold and of the countermold is defined by that fraction of the edge portions of the holding members which projects by the distance DF beyond the end 218' of the countermold.

In the second embodiment, the mold can be identical to the mold described with reference to the preceding figures, in particular with reference to FIG. 9.

In the first embodiment, it is possible to replace the holding fingers 22A and 22B with suitable shaping of the edge portions of the shaping clamps 48A and 48B which then perform the same role as the holding members 223A, 223B, and 223C of the second embodiment. However, it is then necessary to modify the mode of actuating the arms of said clamps, e.g. by using an actuator that moves them towards each other or that moves them apart independently of the movement of the mold, so that said arms remain closed while the undercut-forming portions of the mold are moving relative to each other so as to continue to hold the object during this movement.

In the second embodiment, the anchoring pieces in relief generate imprints in the wall of the thermoformed object. Said imprints can be formed in the rim or else be situated thereunder.

The anchoring pieces in relief can also contribute to forming a specific portion of said object, e.g. a portion of the fastening collar for fastening to a tamper-proofing band for a cap.

It should be apparent that the foregoing relates only to the preferred embodiments of the present application and that numerous changes and modifications may be made herein without departing from the general spirit and scope of the invention as defined by the following claims and the equivalents thereof.

We claim:

1. A device for thermoforming an object presenting an undercut portion and a base portion, the device comprising: a thermoforming mold having a base portion and at least two undercut-forming portions in the vicinity of an open end; a countermold having an end that is suitable for co-operating with said end of the mold so as to clamp a piece of thermoplastic material thereagainst and so as to co-operate with said portions of the mold to define a thermoforming cavity; and a thermoforming piston that is mounted to move between a thermoforming active position in which said piston penetrates into said cavity and an inactive position in which said piston is situated outside said cavity, the two undercut-forming portions of the mold being suitable for being moved apart so as to enable the object to be unmolded; the device further comprising holding means suitable for holding the object relative to the countermold, and, in order to unmold the thermoformed object, said portions of the mold and the holding means being suitable for being controlled in a sequence in which the undercut-forming portions of the mold are moved apart, said holding means are active and hold the object relative to the countermold, and at least the base portion of the mold is spaced apart from the countermold while the holding means are active.

2. A device according to claim 1, wherein the undercut-forming portions of the mold are constrained to move with the base portion of the mold.

3. A device according to claim 1, wherein the mold and the countermold are suitable for being moved relative to each other in order to place respective ends thereof out of contact before the two undercut-forming portions of the mold are moved apart.

4. A device according to claim 1, further comprising pick-up means suitable for picking up the object after said object has been unmolded, said pick-up means and the holding means being suitable for being controlled such that the pick-up means pick up the object while the holding means are holding said object against the end of the countermold, then the holding means cease to hold the object and the pick-up means are moved to bring the object out of the thermoforming device.

5. A device according to claim 1, wherein the holding means comprise holding members suitable for being moved between an active position in which said members are suitable for holding the object relative to the countermold and an inactive position.

6. A device according to claim 5, wherein the holding means comprise fingers secured to arms that are hinged to the countermold.

7. A device according to claim 1, wherein the holding means comprise fingers integral with arms that are hinged to the countermold.

8. A device according to claim 1, wherein, for the purpose of unmolding the object, said portions of the mold and the holding means are suitable for being controlled in a sequence in which, in succession, the undercut-forming portions of the mold are moved apart, the holding means go from an inactive position to an active position in which said holding means hold the object relative to the countermold, and the base portion of the mold is moved apart from the countermold.

9. A device according to claim 8, wherein the holding means comprise fingers which are mounted to move in a join plane in which the undercut-forming portions of the mold join.

10. A device according to claim 1, wherein the holding means are suitable for taking up an inactive position and an active position in which said holding means define a portion of the wall of the thermoforming cavity and in which said holding means are suitable for holding the object relative to the countermold, and wherein said holding means are suitable for occupying the active position thereof while the object is being thermoformed, and while the undercut-forming portions of the mold are being moved apart.

11. A device according to claim 10, wherein the holding means comprise holding members suitable for being moved between an active position in which said members are suitable for holding the object relative to the countermold and an inactive position and wherein the holding members present edge portions which, when said members are in the active position, define, at the end of the countermold, a closed outline in which a pellet of thermoplastic material disposed on the end of the countermold can be wedged for the purpose of being thermoformed in order to form said object.

12. A device according to claim 11, wherein the holding members are supported resiliently relative to the countermold between a wedging position in which, with the mold being spaced apart from the countermold, said members project beyond the end of the countermold over a given projection distance, and a retracted position in which said projection distance is a distance that is reduced or optionally zero.

13. A device according to claim 11, wherein each of the edge portions is provided with at least one anchoring piece in relief for anchoring into the thermoplastic material.

14. A method of thermoforming an object presenting an undercut portion and a base portion, the method comprising the steps of in: using a thermoforming mold having a base portion and at least two undercut-forming portions in the vicinity of an open end; clamping a piece of thermoplastic material by means of the end of a countermold against said end of the mold; defining a thermoforming cavity with said mold portions; bringing a thermoforming piston into a thermoforming active position in which said piston penetrates into the cavity of the mold from an inactive position in which the piston is situated outside said cavity; and, in order to enable the object to be unmolded, moving said undercut-forming portions of the mold apart; and moving the base portion of the mold away from the countermold while holding the object relative to the countermold.

15. A method according to claim 14, wherein, while the object is being held relative to the countermold, the undercut-forming portions and the base portion are moved away from the countermold.

16. A method according to claim 14, wherein, before the undercut-forming portions of the mold are moved apart, the mold and the countermold are moved relative to each other so as to place their respective ends out of contact.

17. A method according to claim 14, wherein, after unmolding, the object is picked up by pick-up means, said object ceases to be held relative to the countermold, and the pick-up means carrying the object are moved.

18. A method according to claim 14, wherein, in order to hold the object relative to the countermold, holding means are moved from an inactive position to an active position in which said holding means are suitable for holding the object relative to the countermold.

19. A method according to claim 18, wherein the holding means are moved from their inactive position to the active position after the undercut-forming portions of the mold have been moved apart.

20. A method according to claim 14, wherein, in order to hold the object relative to the countermold, the holding members are moved between the undercut-forming portions of the mold, as spaced apart from each other.

21. A method according to claim 18, wherein the holding members are moved from the inactive position thereof to the active position before the object is thermoformed, and wherein said holding members are returned to their inactive position only once the undercut-forming portions of the mold have been moved apart.

22. A method according to claim 21, wherein the object is thermoformed from a pellet of thermoplastic material, and wherein, before said object is thermoformed, the periphery of said pellet is shaped by means of the holding members.

* * * * *